April 10, 1956 — E. W. MOORE — 2,741,053
BAIT NET
Filed May 26, 1953
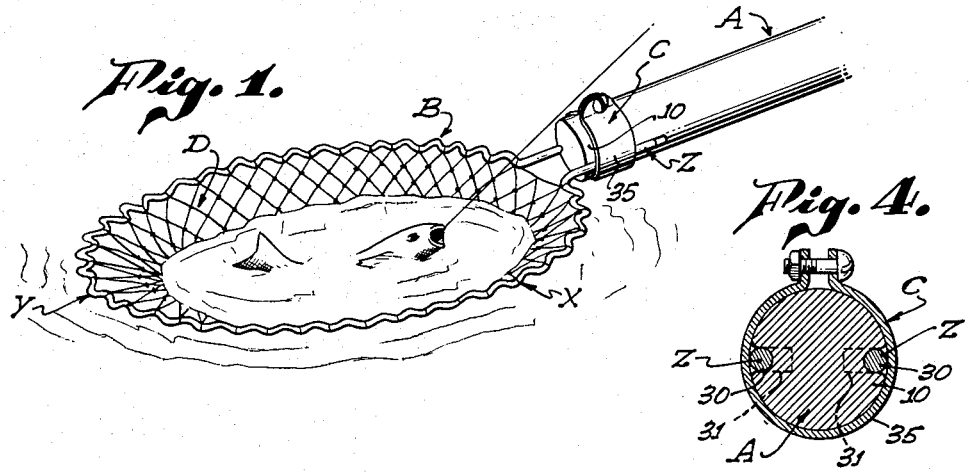
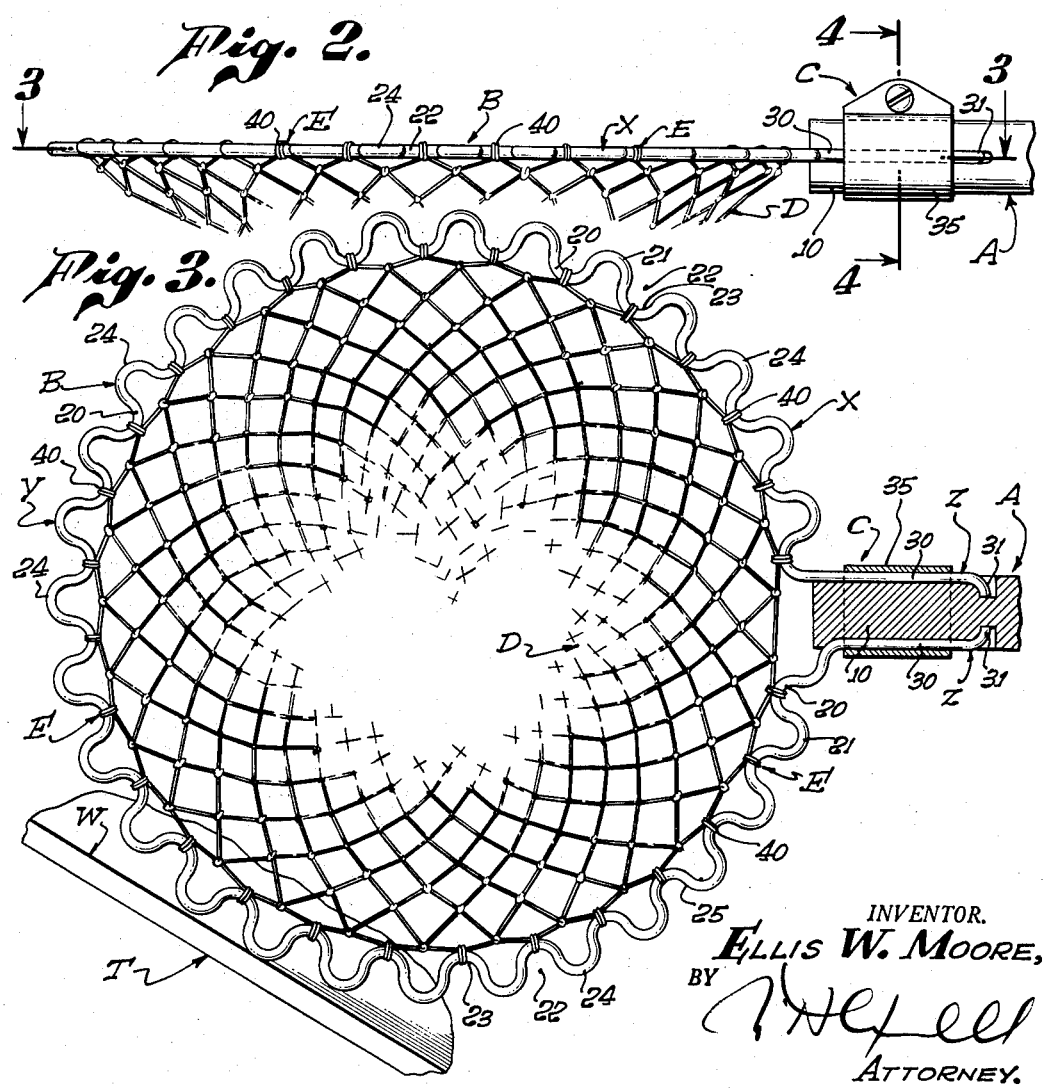
INVENTOR.
ELLIS W. MOORE,
BY
ATTORNEY.

United States Patent Office 2,741,053
Patented Apr. 10, 1956

2,741,053

BAIT NET

Ellis W. Moore, Bell, Calif.

Application May 26, 1953, Serial No. 357,445

2 Claims. (Cl. 43—11)

This invention has to do with bait nets and it is a general object of the invention to provide a fish net of conventional or conical form, having a sinuate rigid annular frame supporting its periphery and an elongate handle supporting the frame and projecting radially therefrom.

Fish nets, more particularly, bait nets, of the general character referred to above have, in the past, been characterized by conical nets having their base portions laced to simple annular rim-like frames by suitable cords, or the like, the frames having handles fixed thereto and projecting laterally therefrom.

The practice of employing simple annular frames, formed by bending straight lengths of wire, or the like, into loops, to support the nets, has in the past, resulted in the nets shifting circumferentially about the frames as the structures are used, with the results that the nets are stretched at one side of the frames and gathered at the opposite side thereof. When this occurs the conical recesses, scoops which are desired to be formed by the nets, become flattened or collapsed and their effectiveness naturally impaired.

It has also been found that the lacings or cords applied to simple annular frames of the conventional bait nets are subject to being severed or damaged as the nets are engaged with the sides of tanks, rocks, or other objects with the result that rather frequent repair or replacement is necessary to keep the nets serviceable.

It is another object of the present invention to provide a bait net of the general character referred to which is not subject to being damaged where the net connects with the frame and wherein the lacings which secure the net to the frame is protected at all times.

It is an object of the present invention to provided a bait net of the general character referred to wherein a portion of the net secured to the frame will not shift relative thereto.

It is still another object of the invention to provide a bait net, that is simple to assemble and which is not subject to damage or failure.

Another object of the present invention is to provide a bait net construction which is both effective and practical and also simple and economical of manufacture.

The various objects and features of my invention will be fully understood from the following detailed description of a typical preferred form and application of the invention, throughout which description reference is made to the accompanying drawings, in which:

Fig. 1 is a perspective view of a bait net employing the present invention and showing the net in use. Fig. 2 is a side elevational view of the fish net, a portion of the net and handle being broken away. Fig. 3 is a plan view taken substantially as indicated by line 3—3 on Fig. 2, the handle member only being shown in section. Fig. 4 is a transverse sectional view taken substantially as indicated by line 4—4 on Fig. 2.

The bait net provided by the present invention and as shown throughout the drawings includes, generally, an elongate handle A, an annular frame B adapted to be carried by the handle A, anchoring means C releasably securing the frame B to the handle A at one end thereof, a net D adapted to be carried by the frame B and fastening means E securing the net D to the frame B.

The handle A provided by the present invention is shown as a simple elongate member such as a round pole and, in practice, it can be advantageously made of wood, as, for instance, it can be formed of dowel-stock, clothes pole stock, or the like.

It can be understood, however that the handle A can, if desired, be made of any suitable material and of any cross-sectional configuration without in any way altering or otherwise interfering with the overall invention disclosed herein.

The frame B as provided by the present invention is in the form of an annular sinuate loop fixed to and projecting beyond the outer or terminal end 10 of the handle A.

In the preferred carrying out of the invention, the frame B is formed of an elongate strip of material such as a metal rod or wire X, round in cross-section and of suitable weight or strength so as to adequately support and carry the net D and which will not break, bend, or otherwise be damaged or mutilated by ordinary use of the structure.

The wire X which forms the frame B is characterized by a middle portion Y bent to form an annular loop which may be considered as disposed in a horizontal plane. The wire has end portions Z in the form of continuations of the middle portion Y, projecting radially from the ends of the loop or middle portion Y.

The looped middle portion Y is characterized by a plurality of horizontally disposed, alternate, arcuate or semicircular curved portions, forming what is in effect a zigzag or sinuate annular loop, having inner and outer curved portions 20 and 21, respectively.

With the frame B formed as just described it will be apparent that every inner curved portion 20 of the annular loop formed by the middle portion Y of wire X, projects radially inward while the outer curved portions 21 which are joined to and bridge the inner curved portions 20, project radially outward, with the result that the loop is characterized by a plurality of circumferentially spaced outwardly opening depressions or recesses 22 having bottom portions 23, formed by the inner curved portions 20, and occuring about the inner periphery of the loop, and outer portions or crests 24, formed by the outer curved portions 21 and occurring about the outer periphery of the loop and radially projecting middle portions 25 connecting or joining the inner and outer portions 23 and 24.

The anchoring means C provided by the present invention is adapted to releasably secure the frame B to the handle A and includes straight, parallel, horizontally disposed arms 30 formed by the end portions Z of the wire X. The arms 30 project substantially radially outward from the ends of the sinuate loop of frame B so that they are parallel with and occur at diametrically opposite sides of the end portion 10 of handle A.

The anchor means C further provides a suitable screw actuated clamp ring 35 adapted to embrace the end portion 10 of handle A against which the arms 30 bear and adapted to hold the arms 30 in engagement therewith. The clamp ring 35 is such as to press and embed the arms 30 into the peripheral wall of the handle A so as to positively prevent relative rotation of the frame B relative to the handle A.

In the preferred carrying out of the present invention the anchoring means C is further provided with jaws 31 at the outer terminal ends of the arms 30. In the particular case illustrated, the jaws 31 are formed by horizontally disposed opposed end portions of the arms 30 and each is adapted to bite into the sides of the handle A when the clamp ring 35 is applied, so as to positively prevent longitudinal movement of the frame B relative to the handle A.

The net D provided by the present invention is a conventional or typical conoidal net, and in the particular case illustrated I have shown what is generally referred to as a bait net netting.

In the case under consideration I have illustrated an ideal situation wherein the count or number of mesh about the periphery or base portion of the net D corresponds to the number of recesses 22 occurring about the periphery of the sinuate loop of frame B, with the result that when the net D is fixed to the frame B by the fastening means E it is fully opened or extended.

The means E provided to secure the net D to frame B may vary widely in form and to some extent, in practice may be governed or controlled by the texture or count of the netting used. In the case illustrated I have shown the fastening means E formed of simple, short cords 40 binding or tying the net D to the bottoms 23 of the recesses 22 about the inner periphery of the loop of the frame B.

With the structure provided by the present invention it will be apparent that when the net D is applied to the sinuate loop of frame B in the manner illustrated and by any suitable fastening or tying means E, relative circumferential movement or shifting of the net D about the periphery of the loop of frame B is positively checked by the radially disposed middle portions 25 of the recesses 22 and the fastening means E securing the net to the frame is protected at all times by the outer portions or crests 24 of the recesses 22.

In Fig. 3 of the drawings I have shown the sinuate loop of frame B engaged with the wall W of a tank T which clearly illustrates the manner in which the fastening means E and the net D are protected against damage or mutilation by the sinuate construction of the loop.

It is to be understood that in practice the number of recesses 22 formed about the periphery of frame B can be varied greatly as to size and number so as to accommodate nets of varying size and mesh count.

It is also to be understood that the frame B could, if desired, be formed of strap material rather than wire without in any way altering or changing the operation and function of the structure disclosed herein.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A bait net of the character described including, an elongate normally horizontally disposed handle, a normally horizontally disposed sinuate wire frame looped about a center and having horizontally disposed radially and circumferentially spaced inner and outer portions, anchoring means securing the frame at one end of the handle, a conoidal net having an annular base and fastening means securing the base portion of the net to the frame.

2. A bait net of the character described including, an elongate normally horizontally disposed handle, a normally horizontally disposed sinuate wire frame looped about a center and having horizontally disposed radially and circumferentially spaced inner and outer portions, anchoring means securing the frame at one end of the handle, a conoidal net having an annular base and fastening means spaced circumferentially about the base portion of the net and securing the base portion of the net to the inner portions of the frame.

References Cited in the file of this patent

UNITED STATES PATENTS

| | | |
|---|---|---|
| 574,986 | Dreisbach | Jan. 12, 1897 |
| 1,673,614 | Boening | June 12, 1928 |
| 2,205,706 | Wolff | June 25, 1940 |

FOREIGN PATENTS

| | | |
|---|---|---|
| 26,337 | Great Britain | 1909 |
| 1,000,437 | France | Feb. 12, 1952 |